United States Patent
Ohtomo

(10) Patent No.: US 8,933,670 B2
(45) Date of Patent: Jan. 13, 2015

(54) POWER SUPPLY SYSTEM, ELECTRIC VEHICLE AND CHARGING ADAPTER

(75) Inventor: Yosuke Ohtomo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 304 days.

(21) Appl. No.: 13/612,618

(22) Filed: Sep. 12, 2012

(65) Prior Publication Data

US 2013/0076122 A1  Mar. 28, 2013

(30) Foreign Application Priority Data

Sep. 22, 2011  (JP) .................................. 2011-207145

(51) Int. Cl.
| | | |
|---|---|---|
| H02J 7/00 | (2006.01) | |
| B60L 11/18 | (2006.01) | |
| H02J 3/32 | (2006.01) | |
| H02J 7/04 | (2006.01) | |

(52) U.S. Cl.
CPC ............... *B60L 11/1844* (2013.01); *H02J 3/32* (2013.01); *H02J 7/042* (2013.01); *Y04S 10/126* (2013.01); *Y02E 60/721* (2013.01); *Y02T 10/7088* (2013.01); *Y02T 10/7005* (2013.01); *Y02T 90/163* (2013.01); *Y02T 90/14* (2013.01); *Y02T 90/128* (2013.01)
USPC ........................................ 320/133; 320/160

(58) Field of Classification Search
CPC .. G01R 31/3648; H02J 7/0078; H02J 7/0093; H02J 7/008; H02J 7/0073; H02J 7/0081; Y02E 60/12; H01M 10/44
USPC ........................................................ 320/133
See application file for complete search history.

(56) References Cited

U.S. PATENT DOCUMENTS

| | | |
|---|---|---|
| 2011/0199048 A1 | 8/2011 | Yokoyama et al. |
| 2011/0224841 A1* | 9/2011 | Profitt-Brown et al. ........... 701/2 |
| 2013/0002188 A1* | 1/2013 | Uyeki ............................ 320/101 |
| 2013/0069659 A1* | 3/2013 | Iwasaki et al. ................. 324/426 |
| 2013/0093393 A1* | 4/2013 | Shimotani et al. ............. 320/109 |
| 2013/0293201 A1* | 11/2013 | Ono, Tomoya ................ 320/138 |

FOREIGN PATENT DOCUMENTS

| | | |
|---|---|---|
| JP | 2003-333706 A | 11/2003 |
| JP | 2008-278740 A | 11/2008 |
| JP | 2010-288345 A | 12/2010 |
| JP | 2011-130648 A | 6/2011 |
| JP | 2011-172327 A | 9/2011 |

OTHER PUBLICATIONS

Notification of Reason(s) for Refusal dated Jul. 30, 2013.

* cited by examiner

*Primary Examiner* — Arun Williams
(74) *Attorney, Agent, or Firm* — McGinn IP Law Group, PLLC

(57) ABSTRACT

There are provided a power supply system, an electric vehicle and a charging adapter. Electric power from a commercial power supply is distributed to electric lines by way of a distribution board and provided to electric apparatuses and an electric vehicle from the electric lines. When power consumption of electric apparatuses exceeds a predetermined value upon charging the electric vehicle, charging power to be supplied to the electric vehicle is decreased. Decreasing the charging power to the electric vehicle can avoid the restriction of the use of the electric apparatuses, thereby improving user's satisfaction.

6 Claims, 7 Drawing Sheets

POWER SUPPLY SYSTEM, ELECTRIC VEHICLE AND CHARGING ADAPTER

CROSS REFERENCES TO RELATED APPLICATIONS

The present application claims priority from Japanese Patent Application No. 2011-207145 filed on Sep. 22, 2011, the entire contents of which are hereby incorporated by reference.

BACKGROUND OF THE INVENTION

1. Field of the Invention

The present invention relates to a power supply system, an electric vehicle and a charging adapter, and, in particular, to a technology that enhances convenience upon charging the electric vehicle.

2. Description of the Related Art

In recent years, electric vehicles that are equipped with an electric motor for propulsion have been under development. The electric vehicle is equipped with an electric storage device such as battery. Upon charging the electric storage device, an external power source and the electric vehicle are connected via a charging cable. Furthermore, in the field of hybrid electric vehicles that are equipped with an engine and an electric motor for propulsion, so called a plug-in type vehicle is under development whose electric storage device is charged with an external power source.

Since charging the electric storage device of the electric vehicle requires large electric power (for example, 1.5 kW to 40 kW), current passing upon charging may exceed a permissible current value of a charging facility, whereby a breaker may be activated. Thus, a charging system is developed that, in a facility where a plurality of electric vehicles can be charged, charges electric vehicles in a cooperative manner so that current does not exceed a permissible current value of the facility, preventing a breaker from being activated (see, for example, Japanese Unexamined Patent Application Publication No. 2003-333706).

In a typical household, an electric power line that is used for bringing in charging power is not prepared as a dedicated electric power line for charging an electric vehicle, but is often a common electric line that is also used for supplying electric power to other electric apparatuses. In the case where the electric power line that is used for bringing in charging power is such a common electric line also used for other electric apparatuses, it is necessary to restrict the use of other electric apparatuses when the electric storage device is charged so as to prevent an activation of a breaker due to excess current. However, since charging of the electric storage device is continued for a long period of time, restricting the use of other electric apparatuses upon charging the electric storage device significantly impairs user's convenience.

BRIEF SUMMARY OF THE INVENTION

The present invention is made in view of the above, and it is an object of the present invention to avoid the restriction of the use of an electric apparatus upon charging an electric storage device.

An aspect of the present invention provides a power supply system that supplies charging power to an electric vehicle equipped with an electric storage device as well as electric power to another electric apparatus. The power supply system includes a power adjustment unit that increases and decreases charging power to be supplied to the electric storage device based on an operation state of the electric apparatus. When power consumption of the electric apparatus exceeds a predetermined value, the power adjustment unit decreases charging power to be supplied to the electric storage device while maintaining the operation state of the electric apparatus.

Preferably, the power supply system further includes: a time calculator that calculates a charging time until the electric storage device reaches to a predetermined charge state based on charging power supplied to the electric storage device; and a time display that displays a charging time calculated by the time calculator on a display device. The time display continues to display a currently displayed charging time on the display device until a charging time that is longer than the currently displayed charging time by a predetermined value is calculated.

Preferably, when receiving operation scheduling information of the electric apparatus, the power adjustment unit of the power supply system increases charging power until the scheduled electric apparatus starts operating.

Another aspect of the present invention provides an electric vehicle that, when in use, is connected to a power supply system supplying electric power to an electric apparatus, and is equipped with an electric storage device charged with charging power supplied from the power supply system. The electric vehicle includes a power adjustment unit that increases and decreases charging power to be supplied to the electric device based on an operation state of the electric apparatus. When power consumption of the electric apparatus exceeds a predetermined value, the power adjustment unit decreases charging power to be supplied to the electric storage device while maintaining the operation state of the electric apparatus.

Preferably, the electric vehicle further includes: a time calculator that calculates a charging time until the electric storage device reaches to a predetermined charge state based on charging power supplied to the electric storage device; and a time display that displays a charging time calculated by the time calculator on a display device. The time display continues to display a currently displayed charging time on the display device until a charging time that is longer than the currently displayed charging time by a predetermined value is calculated.

Preferably, when receiving operation scheduling information of the electric apparatus, the power adjustment unit of the electric vehicle increases charging power until the scheduled electric apparatus starts operating.

Another aspect of the present invention provides a charging adaptor that, when in use, is connected to a power supply system supplying electric power to an electric apparatus, and supplies charging power to an electric storage device of an electric vehicle. The charging adaptor includes a power adjustment unit that increases and decreases charging power to be supplied to the electric device based on an operation state of the electric apparatus. When power consumption of the electric apparatus exceeds a predetermined value, the power adjustment unit decreases charging power to be supplied to the electric storage device while maintaining the operation state of the electric apparatus.

Preferably, the charging adaptor further includes: a time calculator that calculates a charging time until the electric storage device reaches to a predetermined charge state based on charging power supplied to the electric storage device; and a time display that displays a charging time calculated by the time calculator on a display device. The time display continues to display a currently displayed charging time on the display device until a charging time that is longer than the currently displayed charging time by a predetermined value is calculated.

Preferably, when receiving operation scheduling information of the electric apparatus, the power adjustment unit of the charging adaptor increases charging power until the scheduled electric apparatus starts operating.

According to the present invention, when power consumption of an electric apparatus exceeds a predetermined value, charging power to be supplied to the electric storage device is decreased while the operation state of the electric apparatus is maintained. Therefore, the restriction of the use of the electric apparatus upon charging an electric storage device can be avoided, thereby improving user's satisfaction.

DETAILED DESCRIPTION OF THE INVENTION

Figure 1:
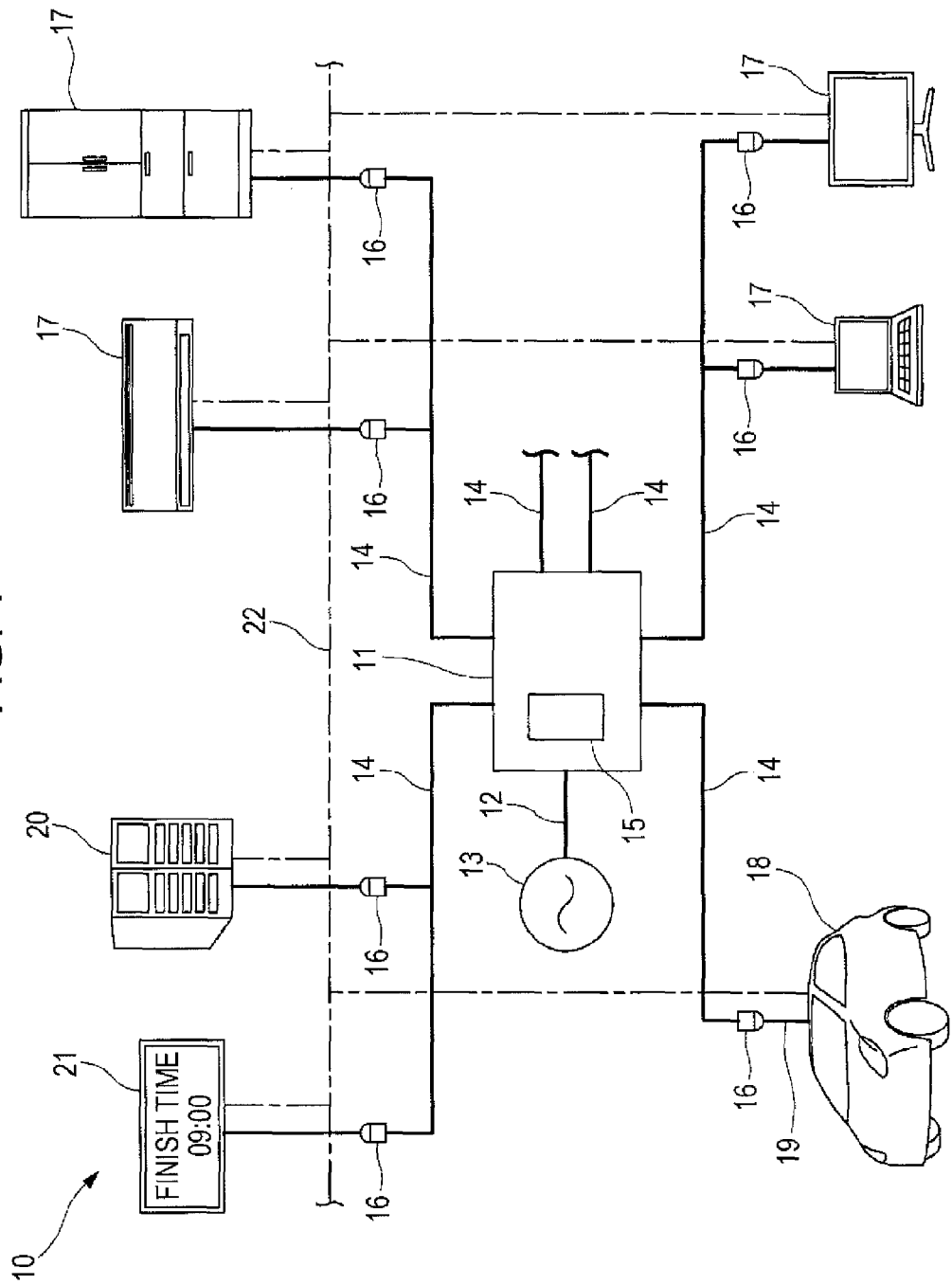
FIG. 1 is a schematic diagram showing a power supply system according to an embodiment of the present invention.

An embodiment of the present invention will hereunder be described with reference to the drawings. FIG. 1 is a schematic diagram showing a power supply system 10 according to an embodiment of the present invention. As shown in FIG. 1, a distribution board 11 that is installed at a house or the like takes in electric power from a commercial power supply 13 via an incoming line 12. A plurality of electric lines 14 are connected to the distribution board 11, and electric power from the commercial power supply 13 is distributed to the electric lines 14 by way of the distribution board 11. The distribution board 11 includes a breaker 15 that detects overcurrent and blocks off an electric power system. Outlets 16 that are provided to the electric lines 14 are connected to a plurality of electric apparatuses 17. Upon charging, the electric vehicle 18 is connected to one of the outlets 16 via a charging cable 19. Further, the illustrated power supply system 10 has formed therein a home automation system that integrally controls the electric vehicle 18 and electric apparatuses 17 which are connected thereto. The home automation system is configured with a control server 20 that integrally controls the electric vehicle 18 and the electric apparatuses 17 and a monitor (display device) 21. The control server 20 and the monitor 21 are connected to the outlets 16.

The illustrated power supply system 10 has formed therein a communication network 22. The control server 20, the monitor 21, the electric vehicle 18 and the electric apparatuses 17 are connected to each other via the communication network 22. The electric apparatuses 17 send information indicating an operation state such as power consumption to the control server 20. When a user schedules the operation of the electric apparatuses 17, the scheduled apparatus 17 send operation scheduling information to the control server 20. The control server 20 also receives from the electric vehicle 18 information indicating a charging state such as charging power. Then the control server 20 sends a control signal to the electric vehicle 18 and the electric apparatuses 17 and information for display that indicates the operation state of the power supply system 10 to the monitor 21, as may be necessary. Note that the communication network 22 may be configured using a dedicated communication line, a wireless device or a power line communication (PLC) line that uses the electric lines 14 as communication lines.

Figure 2:
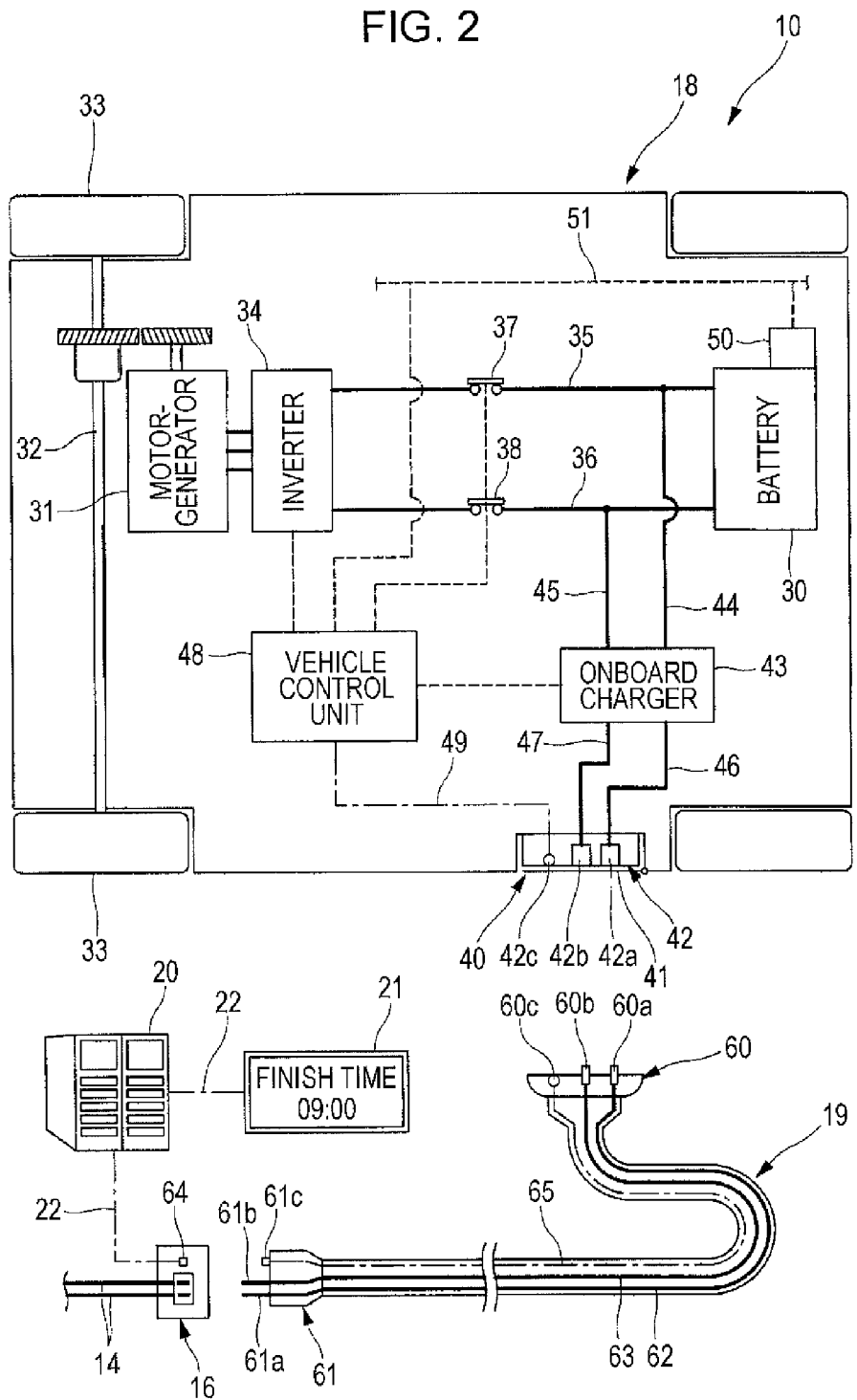
FIG. 2 is a schematic diagram showing an internal structure of an electric vehicle.

FIG. 2 is a schematic diagram showing an internal structure of the electric vehicle 18. As shown in FIG. 2, the electric vehicle 18 includes a battery 30 such as a lithium-ion rechargeable battery as an electric storage device. The electric vehicle 18 also includes a motor-generator 31 as a driving source. The motor-generator 31 is connected to drive wheels 33 via a drive axle 32. The motor-generator 31 is connected to the battery 30 via an inverter 34 that bidirectionally converts DC power and AC power. When the motor-generator 31 is power-driven, the inverter 34 converts DC power to AC power, and the battery 30 supplies electric power to the motor-generator 31. When the motor-generator 31 is regeneratively driven, on the other hand, the inverter 34 converts AC power to DC power, and the motor-generator 31 supplies electric power to the battery 30. Power lines 35 and 36 that connect the battery 30 and the inverter 40 have main relays 37 and 38 respectively.

As shown in FIG. 2, the electric vehicle 18 has a charging port 40 to be connected to the charging cable 19. The charging port 40 is configured with a charging lid 41 that is openably and closably disposed at the vehicle body and a power receiving connector 42 that is housed inside the charging lid 41. The electric vehicle 18 is equipped with an onboard charger 43 that is configured with a rectifier circuit, a switching element, a transformer, a smoothing condenser and the like, which are not shown in the drawing. The onboard charger 43 has a pair of output lines 44 and 45. The output line 44 is connected to the power line 35 at a side of a positive electrode, whereas the output line 45 is connected to the power line 36 at a side of a negative electrode. The onboard charger 43 also has a pair of input lines 46 and 47. The input lines 46 and 47 are respectively connected to power receiving terminals 42a and 42b of the power receiving connector 42. The electric vehicle 18 further includes a vehicle control unit 48 that controls the inverter 34, the main relays 37 and 38, the onboard charger 43 and the like. The vehicle control unit 48 is connected to a communication line 49. The communication line 49 is connected to a signal terminal 42c of the power receiving connector 42. The electric vehicle 18 further includes a battery control unit 50 that manages charging and discharging of the battery 30. The vehicle control unit 48 and the battery control unit 50 are connected to each other via an in-vehicle network 51 such as CAN. Each of the control units 48 and 50 is equipped with a CPU, a memory and the like.

Figure 3:
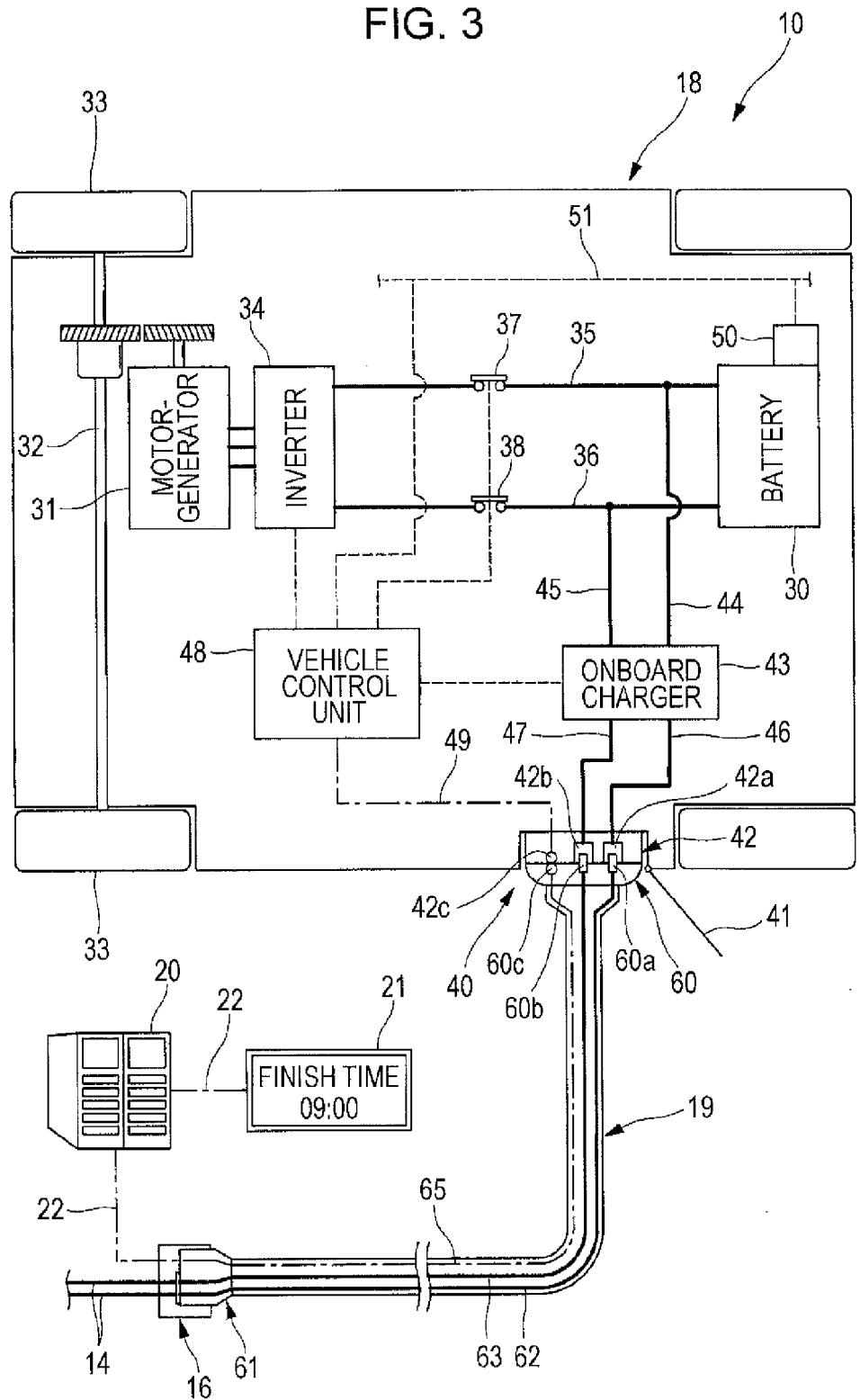
FIG. 3 is a schematic diagram showing the electric vehicle which is connected to a charging cable.

As shown in FIG. 2, the charging cable 19 connecting the outlet 16 and the power receiving connector 42 upon battery charging has, at an end thereof, a power supply connector 60 that is attachable and detachable to the power receiving connector 42 and, at the other end thereof, a plug 61 that is attachable and detachable to the outlet 16. The power supply connector 60 of the charging cable 19 has a pair of power supply terminals 60a ant 60b that correspond to the power receiving terminals 42a and 42b. The plug 61 of the charging cable 19 has a pair of pins 61a and 61b that correspond to slots of the outlet 16. The pins 61a and 61b are connected to the power supply terminals 60a and 60b via power supply lines 62 and 63. As shown in FIG. 2, the outlet 16 has a communication jack 64 that is connected to the communication network 22. The plug 61 of the charging cable 19 has a communication plug 61c that corresponds to the communication jack 64, and the power supply connector 60 of the charging cable 19 has a signal terminal 60c that corresponds to the signal terminal 42c. The plug 61c and the signal terminal 60c are connected via a communication line 65. FIG. 3 is a schematic diagram showing the electric vehicle 18 which is connected to the charging cable 19. As shown in FIG. 3, when the battery 30 of the electric vehicle 18 is charged using electric power supplied from the power supply system 10, the plug 61 of the charging cable 19 is connected to the outlet 16. The charging lid 41 is opened to expose the power receiving connector 42, and then the power supply connector 60 of the charging cable 19 is connected to the power receiving connector 42 of the electric vehicle 18. Accordingly, the electric lines 14 of the power supply system 10 are connected to the battery 30 via the charging cable 19 and the onboard charger 43. Besides, the control server 20 of the power supply system 10 is connected to the vehicle control unit 48 via the charging cable 19. When the charging cable 19 is thus connected, the control server 20 sets charging power that can be supplied to the electric vehicle 18 based on the power consumption of the other electric apparatuses 17 and the power supply capacity of the power supply system 10. Then the control server 20 instructs the vehicle control unit 48 of the charging power thus set, and the vehicle control unit 48 controls the onboard charger 43 within the instructed charging power. Then the onboard charger 43 converts AC power of low voltage (for example, 100 V) input from the charging cable 19 to DC power of high voltage (for example, 400 V) and outputs it to battery 30 until the battery voltage reaches a predetermined target voltage (for example, 400V). The power supply capacity of the power supply system 10 is a value of power (current) that can be taken in from the commercial power supply 13. More specifically, the supply capacity of the power supply system 10 is a value of contract demand that is set with an electric company, and is a value of electric power (current) at which the breaker 15 of the distribution board 11 blocks off the electric power system.

Figure 4:
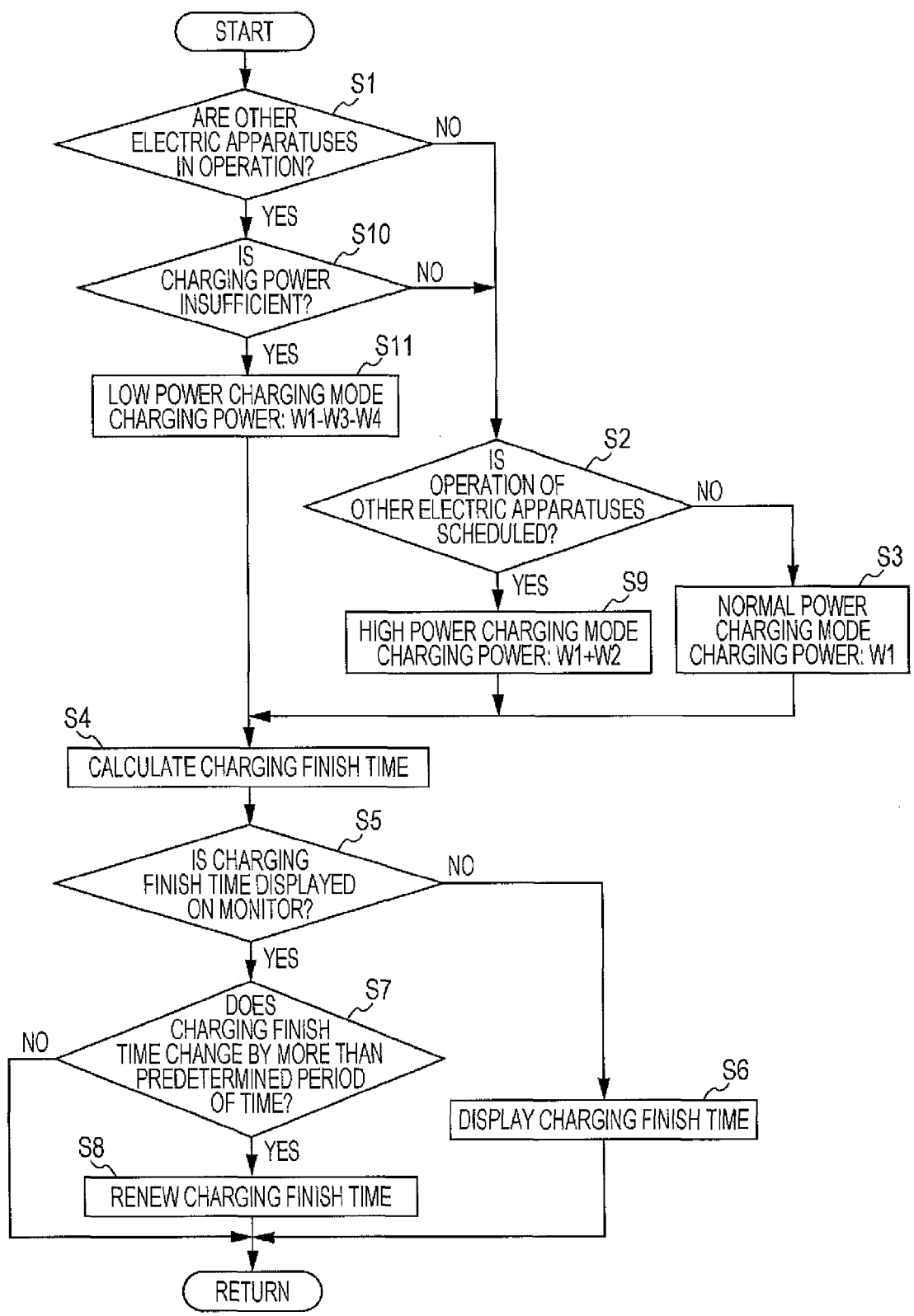
FIG. 4 is a flowchart showing an example of execution steps of charging power setting control.

Now charging power setting control performed by the control server 20 will be explained. FIG. 4 is a flowchart showing an example of execution steps of the charging power setting control. As shown in FIG. 4, step S1 determines whether or not the other electric apparatuses 17 are in operation. When in step S1 the other electric apparatuses 17 are not determined to be in operation, the flow proceeds to step S2 that determines whether or not the operation scheduling of the electric apparatuses 17 is set based on the reception state of the operation scheduling information. When in step 2 the operation scheduling of the other electric apparatuses 17 is determined not to be set, which is a state where sufficient charging power is secured, the flow proceeds to step 53 where a normal charging mode (charging power: W1) is set, and the battery 30 is charged within the range of the charging power W1. Then the flow proceeds to step S4 that calculates a charging time until the battery 30 reaches a predetermined state of charge (SOC) (for example, 100%), based on the charging power supplied to the battery 30. Then in step 4, the calculated charging time is added to a current time to calculate a charging finish time when charging of the battery 30 is complete. The control server 20 is capable of calculating the charging time by referring to the charging power, the battery voltage and the like.

Furthermore, the control server 20 receives from the vehicle control unit 48 current charging power and current battery voltage.

Then the flow proceeds to step S5 that determines whether or not the charging finish time is displayed on the monitor 21. When the charging finish time is not displayed in step S5, the flow proceeds to step S6 that displays a newly calculated charging finish time on the monitor 21. When the charging finish time is displayed in step S5, on the other hand, the flow proceeds to step S7 that determines whether or not the newly calculated charging finish time is different from (earlier or later than) the displayed charging finish time by more than a predetermined period of time. When in step S7 the newly calculated charging finish time is determined to be different from the displayed charging finish time by more than the predetermined period of time, the flow proceeds to step S8 that renews the displayed time on the monitor 21 to the newly calculated charging finish time. On the other hand, when in step 7 the newly calculated charging finish time is determined not to be different by more than a predetermined period of time, the flow exits the routine with the displayed time on the monitor 21 being maintained. That is, the current displayed time continued to be displayed until a time is calculated is earlier or later than the current displayed time by more than the predetermined period of time.

When in step S2 the operation scheduling of the other electric apparatuses 17 is determined not to be set, there might be caused a charging power shortage upon the subsequent operation of the other electric apparatuses 17. Thus the flow proceeds to step S9 where a high power charging mode (charging power: W1+W2) is set, and the battery 30 is charged within the range of the charging power (W1+W2). That is, in the high power charging mode, charging power is increased compared to the above-described normal charging mode. The charging power W2 which is added in the high power charging mode is set based on surplus power that the power supply system 10 can supply or power that the battery 30 can accept. In this manner, when a user schedules the operation of the electric apparatuses 17 and thus there might be caused a charging power shortage after a predetermined period of time, the battery 30 is charged in the high power charging mode before a charging power shortage occurs. In so doing, even if charging power which can be supplied to the battery 30 is restricted afterwards, it is possible to prevent the charging finish time from being significantly prolonged, thereby improving user's satisfaction.

When in above-described step S1 the other electric apparatuses 17 are determined to be in operation, the flow proceeds to step S10 that determines whether or not there occurs a shortage of charging power that can be allocated to the electric vehicle 18, based on the power consumption of the other electric apparatuses 17 and the power supply capacity of the power supply system 10. When in step S10 it is determined that charging power is sufficient, that is, charging power (W1+W2) for the high power charging mode can be secured, the flow proceeds to step S2 where the battery 30 is charged according to the above-described steps. On the other hand, when in step S10 that charging power is insufficient, that is, charging power (W1+W2) for the high power charging mode cannot be secured, the flow proceeds to step S1 where a low power charging mode (charging power: W1−W3−W4) is set, and the battery 30 is charged within the range of the charging power (W1−W3−W4). In this manner, when there occurs a shortage of charging power, that is, the power consumption of the electric apparatuses 17 exceeds a predetermined value, charging power is reduced compared to the normal charging mode. The power W4 which is subtracted in the low power charging mode is power that is set in advance to avoid the charging finish time from being frequently prolonged.

As described above, when the electric apparatuses 17 consume large power and thus there occurs a shortage of charging power that can be allocated to the electric vehicle 18, the low power charging mode is performed which reduces charging power while maintaining the operation state of the electric apparatuses 17. Accordingly, even when the battery 30 is being charged, the restriction of the use of the electric apparatus 17 can be avoided, thereby improving user's satisfaction. Further, when the low power charging mode is performed, charging power is reduced, and thus the charging time is extended and the charging finish time is prolonged. Furthermore, in the low power charging mode, it is expected that charging power frequently changes according to a change in power consumption, and that the charging finish time is frequently prolonged. As described above, however, the charging finish time displayed on the monitor 21 is renewed only when the newly calculated charging finish time is prolonged by more than the predetermined period of time (step S8). Accordingly, the charging finish time can be avoided from being frequently prolonged, thereby improving user's satisfaction. Furthermore, in the low power charging mode, the power W4 is further subtracted from the charging power (W1–W3) which can be secured. In this manner, when it cannot be guaranteed that the charging power is secured, the charging finish time is given an allowance by reducing the charging power with a margin. Accordingly, the charging finish time can be avoided from being frequently prolonged, thereby improving user's satisfaction.

In the above description, the control server 20 sets the charging power based on the operation state of the other electric apparatuses 17 and instructs the vehicle control unit 48 of the set charging power, whereas the vehicle control unit 48 controls the onboard charger 43 based on the instructed charging power. That is, in the above description, a power adjustment unit is configured with the control server 20, the vehicle control unit 48 and the onboard charger 43. However, the configuration of the power adjustment unit is not limited to this. Alternatively, for example, the power adjustment unit may be configured only with the vehicle control unit 48 and the onboard charger 43. In this case, each of the electric apparatuses 17 sends to the vehicle control unit 48 information indicating an operation state such as power consumption, and an electric apparatus 17 whose operation is scheduled by a user sends operation scheduling information. Then the vehicle control unit 48 sets the charging power based on the operation state of the other electric apparatuses 17 and controls the onboard charger 43 based on the set charging power.

Figure 5:
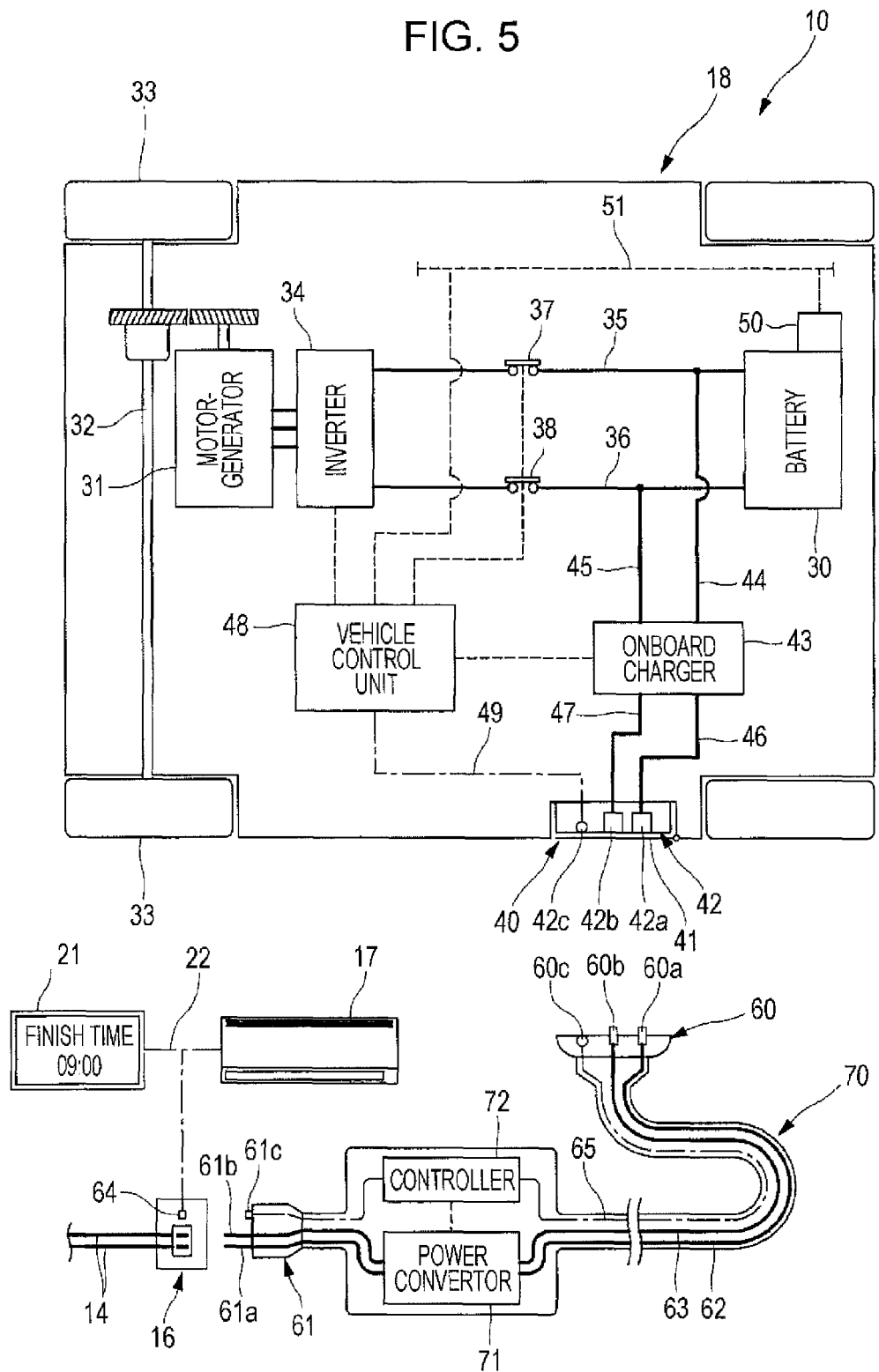
FIG. 5 is a schematic diagram showing a part of a power supply system according to another embodiment of the present invention.
Figure 6:
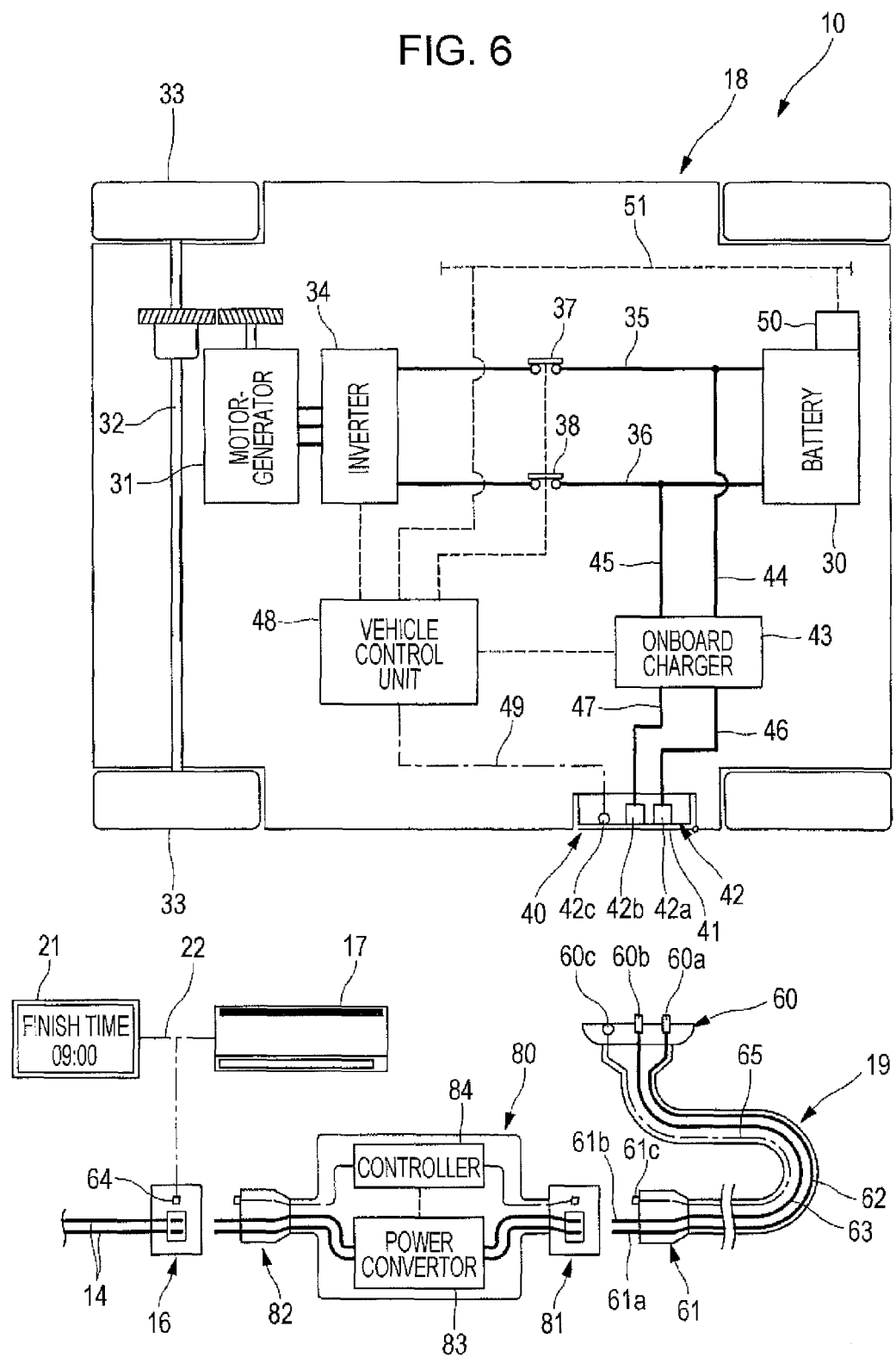
FIG. 6 is a schematic diagram showing a part of a power supply system according to another embodiment of the present invention.
Figure 7:
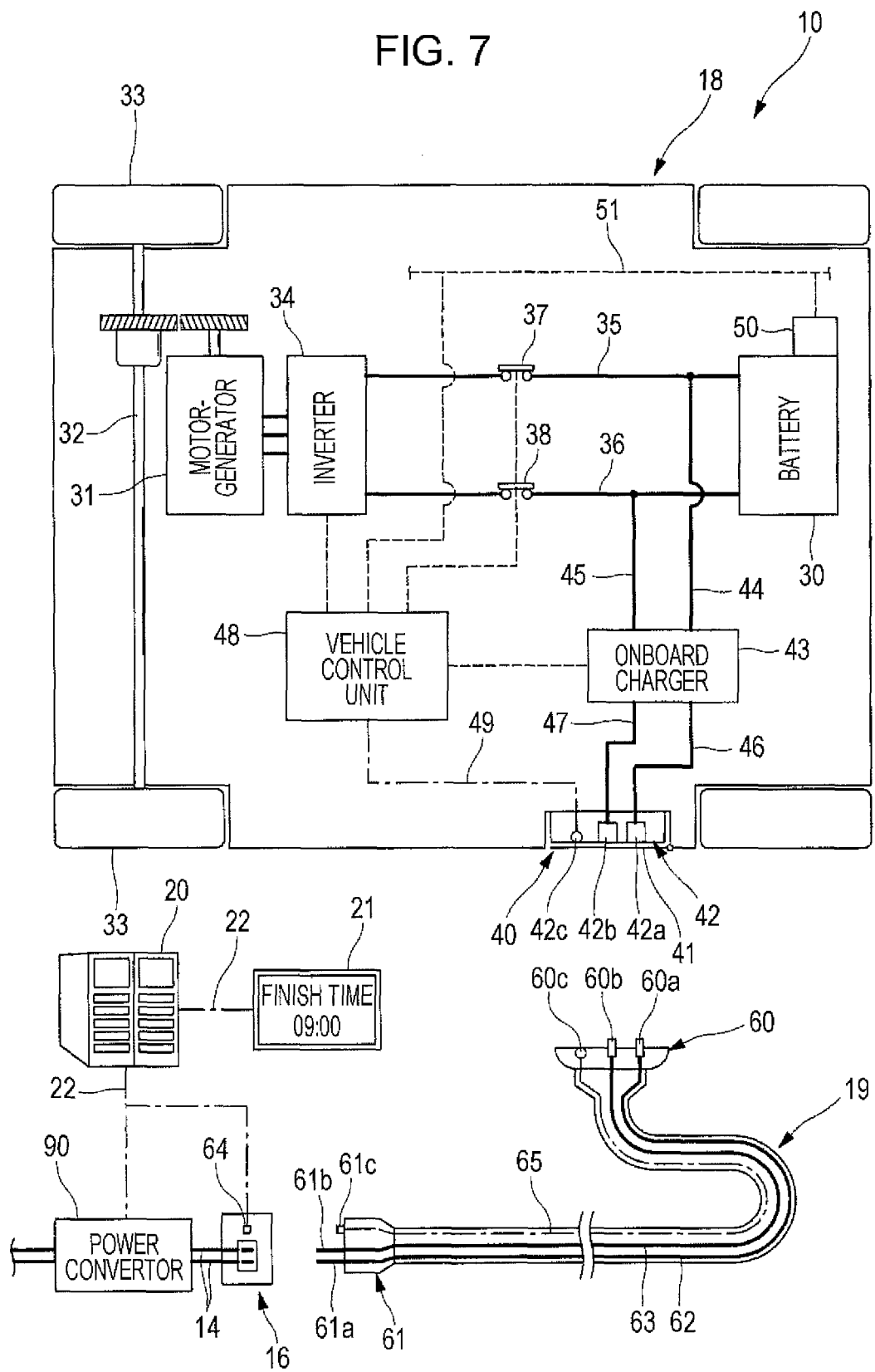
FIG. 7 is a schematic diagram showing a part of a power supply system according to another embodiment of the present invention.

The configuration of the power adjustment unit is not limited to the above description and may be configured with another component. FIGS. 5 to 7 are schematic diagrams showing a part of the power supply system 10 according to other embodiments of the present invention. In FIGS. 5 to 7, components that are identical to components shown in FIGS. 1 and 2 are denoted by like reference numerals, and descriptions thereof are omitted.

As shown in FIG. 5, a charging cable (charging adaptor) 70 that connects the outlet 16 and the electric vehicle 18 is equipped with a power convertor 71 that is configured with a rectifier circuit, a switching element and the like, which are not shown in the drawing. Incorporating the power convertor 71 into the charging cable 70 in this manner can increase and decrease DC power passing through the charging cable 70. The charging cable 70 is further equipped with a controller 72 that is configured with a CPU, a memory, and the like. The controller 72 receives power consumption and operation scheduling information from the electric apparatuses 17. Then the controller 72 sets charging power based on the power consumption of the electric apparatuses 17 and outputs a control signal to a power convertor 71 such that charging power does not exceed the set charging power. Accordingly, even if the control server 20 is not provided, the vehicle control unit 48 does not have a function of communicating with the control server 20, or the onboard charger 43 does not have a function of increasing and decreasing charging power, a similar effect to the one described above can be obtained. In the embodiment shown in FIG. 5, the controller (time calculator) 72 calculates the charging time and the charging finish time and the controller (time display) instructs the monitor 21 to display the charging finish time. While in the embodiment shown in FIG. 5 the controller 72 and the power convertor 71 serve as the power adjustment unit, the present invention is not limited to this. Alternatively, the control server 20 may serve as the power adjustment unit, and the power convertor 71 may be controlled with a control signal from the control server 20.

As shown in FIG. 6, a charging adaptor 80 is disposed between the charging cable 19 and the outlet 16. The charging adaptor 80 has, at an end thereof, an outlet 81 that is attachable and detachable to a plug 61 and, at the other end thereof a plug 82 that is attachable and detachable to the outlet 16. Disposing the charging adaptor 80 between the charging cable 19 and the outlet 16 allows the electric lines 14 of the outlet 16 to be connected to the power supply lines 62 and 63 of the charging cable 19 and allows the communication jack 64 of the outlet 16 to be connected to the communication line 65 of the charging cable 19. The charging adaptor 80 is equipped with a power convertor 83 that is configured with a rectifier circuit, a switching element and the like, which are not shown in the drawing. Incorporating the power convertor 83 into the charging cable 19 in this manner can increase and decrease DC power input to the charging cable 19. The charging adaptor 80 is further equipped with a controller 84 that is configured with a CPU, a memory, and the like. The controller 84 receives power consumption and operation scheduling information from the electric apparatuses 17. Then the controller 84 sets charging power based on the power consumption of the electric apparatuses 17 and outputs a control signal to a power convertor 83 such that charging power does not exceed the set charging power. Accordingly, even if the control server 20 is not provided, the vehicle control unit 48 does not have a function of communicating with the control server 20, or the onboard charger 43 does not have a function of increasing and decreasing charging power, a similar effect to the one described above can be obtained. In the embodiment shown in FIG. 6, the controller (time calculator) 84 calculates the charging time and the charging finish time and the controller (time display) 84 instructs the monitor 21 to display the charging finish time. While in the embodiment shown in FIG. 6 the controller 84 and the power convertor 83 serve as the power adjustment unit, the present invention is not limited to this. Alternatively, the control server 20 may serve as the power adjustment unit, and the power convertor 83 may be controlled with a control signal from the control server 20.

As shown in FIG. 7, the electric lines 14 of the outlet 16 are equipped with a power converter 90 that is configured with a rectifier circuit, a switching element and the like, which are not shown in the drawing. Incorporating the power convertor 90 into the outlet 16 in this manner can increase and decrease AC power output from the outlet 16. Upon charging, the power converter 90 controls output power so as not to exceed set charging power, based on a control signal from the control server 20. Accordingly, even if the vehicle control unit 48 does not have a function of communicating with the control server 20, or the onboard charger 43 does not have a function of increasing and decreasing charging power, a similar effect to the one described above can be obtained.

The present invention is not limited to the above-described embodiments. It will be apparent to those skilled in the art that various changes may be made without departing from the scope of the present invention. In the above description, the electric apparatuses 17 send power consumption to the control server 20, but the present invention is not limited to this. Alternatively, the distribution board 11 may send power consumption to the control server 20 and the like. Similarly, the distribution board 11 may send currently-supplied charging power to the control server 20 and the like. Further, in the above description, while the charging finish time which can be obtained by adding the charging time to the current time is displayed on the monitor 21, the charging time does not necessarily have to be shown in such a time format. Alternatively, the charging time (remaining time before charging is complete) may be displayed on the monitor 21 as it is.

The illustrated electric vehicle 12 is an electric vehicle which only has the motor-generator 31 for propulsion, but may be a hybrid-type electric vehicle that includes a motor-generator and an engine for propulsion. Furthermore, the battery 30 which is a lithium-ion rechargeable battery, a nickel metal hydride rechargeable battery or the like is used as the electric storage device, but the present invention is not limited to this. Alternatively, a capacitor such as a lithium-ion capacitor and an electric double layer capacitor may be used as the electric storage device.

What is claimed is:

1. A power supply system that supplies charging power to an electric vehicle equipped with an electric storage device as well as electric power to another electric apparatus, the power supply system comprising:
   a power adjustment unit that increases and decreases charging power to be supplied to the electric storage device based on an operation state of the electric apparatus,
   wherein, the power adjustment unit has, as a charging mode, a first charging mode in which the electric storage device is charged with first charging power, a second charging mode in which the electric storage device is charged with second charging power smaller than the first power, and a third charging mode in which the electric storage device is charged with third charging power larger than the first power;
   wherein, when power consumption of the electric apparatus exceeds a predetermined value, the power adjustment unit switches the charging mode from either one of the first charging mode and the third charging mode to the second charging mode so as to decreases charging power to be supplied to the electric storage; and
   wherein, when receiving operation scheduling information of the electric apparatus, the power adjustment unit switches the charging mode from either one of the first charging mode and the second charging mode to the third charging mode so as to increase charging power to be supplied to the electric storage device.

2. The power supply system according to claim I, further comprising:
   a time calculator that calculates a charging time until the electric storage device reaches to a predetermined charge state based on charging power supplied to the electric storage device; and
   a time display that displays a charging time calculated by the time calculator on a display device,
   wherein the time display continues to display a currently displayed charging time on the display device until a charging time that is longer than the currently displayed charging time by a predetermined value is calculated.

3. An electric vehicle that, when in use, is connected to a power supply system supplying electric power to an electric apparatus, the electric vehicle comprising:
   an electric storage device charged with charging power supplied from the power supply system,
   wherein the electric vehicle includes a power adjustment unit that increases and decreases charging power to be supplied to the electric device based on an operation state of the electric apparatus;
   wherein, the power adjustment unit has, as a charging mode, a first charging mode in which the electric storage device is charged with first charging power, a second charging mode in which the electric storage device is charged with second charging power smaller than the first power, and a third charging mode in which the electric storage device is charged with third charging power larger than the first power;
   wherein, when power consumption of the electric apparatus exceeds a predetermined value, the power adjustment unit switches the charging mode from either one of the first charging mode and the third charging mode to the second charging mode so as to decrease charging power to be supplied to the electric storage device while maintaining the operation state of the electric apparatus; and
   wherein, when receiving operation scheduling information of the electric apparatus, the power adjustment unit switches the charging mode from either one of the first charging mode and the second charging mode to the third charging mode so as to increase charging power to be supplied to the electric storage device.

4. The electric vehicle according to claim 3, further comprising:
   a time calculator that calculates a charging time until the electric storage device reaches to a predetermined charge state based on charging power supplied to the electric storage device; and
   a time display that displays a charging time calculated by the time calculator on a display device,
   wherein the time display continues to display a currently displayed charging time on the display device until a charging time that is longer than the currently displayed charging time by a predetermined value is calculated.

5. A charging adaptor that, when in use, is connected to a power supply system supplying electric power to an electric apparatus, and supplies charging power to an electric storage device of an electric vehicle, the charging adaptor comprising:
   a power adjustment unit that increases and decreases charging power to be supplied to the electric device based on an operation state of the electric apparatus,
   wherein, the power adjustment unit has, as a charging mode, a first charging mode in which the electric storage device is charged with first charging power, a second charging mode in which the electric storage device is charged with second charging power smaller than the first power, and a third charging mode in which the electric storage device is charged with third charging power larger than the first power;
   wherein, when power consumption of the electric apparatus exceeds a predetermined value, the power adjustment unit switches the charging mode from either one of the first charging mode and the third charging mode to the second charging mode so as to decrease charging power to be supplied to the electric storage device while maintaining the operation state of the electric apparatus; and wherein, when receiving operation scheduling information of the electric apparatus, the power adjustment unit switches the charging mode from either one of the first charging mode and the second charging mode to the third charging mode so as to increase charging power to be supplied to the electric storage device.

6. The charging adaptor according to claim 5, further comprising:

a time calculator that calculates a charging time until the electric storage device reaches to a predetermined charge state based on charging power supplied to the electric storage device; and a time display that displays a charging time calculated by the time calculator on a display device, wherein the time display continues to display a currently displayed charging time on the display device until a charging time that is longer than the currently displayed charging time by a predetermined value is calculated.

* * * * *